Dec. 4, 1951 P. H. PROFF 2,577,714
BATTERY CABLE CLAMP
Filed Sept. 7, 1948

INVENTOR.
Philip H. Proff
BY
ATTORNEYS.

Patented Dec. 4, 1951

2,577,714

UNITED STATES PATENT OFFICE

2,577,714

BATTERY CABLE CLAMP

Philip H. Proff, Augusta, Mont.; Leo G. Murphy, executor of said Philip H. Proff, deceased, assignor, by direct and mesne assignments, of ninety-five per cent to Harold Phillip Proff, Olympia, and Margaret M. Schmitz, Seattle, Wash., and five per cent to Leo H. Murphy, Choteau, Mont.

Application September 7, 1948, Serial No. 48,043

2 Claims. (Cl. 173—259)

This invention relates to new and useful improvements in clamps, and more particularly to wet storage battery cable clamps.

Heretofore, most storage battery cable clamps in common use consist of U-shaped body portions which are fitted around the battery posts, and simple fastening means consisting of an ordinary nut and bolt for each body portion. It is a well known fact that cable clamps of this design are extremely difficult to remove from the battery posts, especially when the action of the battery acids has caused them to corrode. Frequently, the removal of this type of clamp requires the employment of several tools, and only by considerable prying and hammering can the clamp be removed. Oftentimes, such operations result in consequent damage to the battery post or cable clamp.

Improvements on this original design have been attempted, but have been, in general, relatively unsuccessful. These improved designs have incorporated numerous parts, requiring considerable machinery operations or complicated molds, resulting in consequent high cost of production. Furthermore, these designs are rendered unsatisfactory in many instances by their number of threaded members which, when they become corroded, bind during operation.

The principal object of this invention is to provide a battery cable clamp, which employs a minimum number of threaded parts, and which can easily be removed from the battery post by the use of only one tool, even under conditions of severe corrosion.

Another object is to provide a battery cable clamp, which is composed of few parts, made from stock materials, and which is consequently manufactured cheaply and easily.

A further object is to provide a battery cable clamp, whose parts are easily adapted to most conventional U-shaped battery cable clamp body designs.

Other objects will be apparent to those skilled in the art from the following detailed description of the annexed drawing which, by way of a preferred example only, illustrates one embodiment of the invention and wherein.

Figure 1:
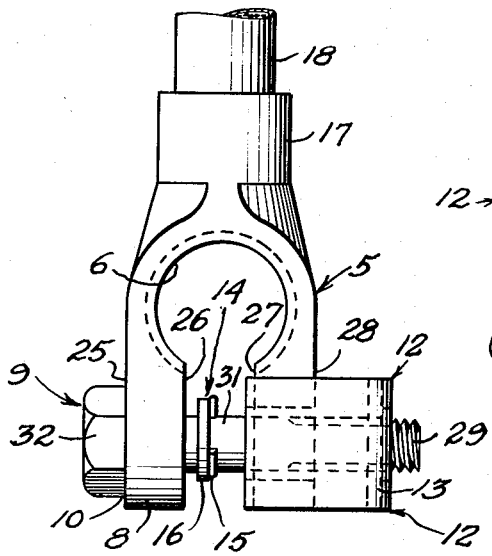
Fig. 1 is a plan view of the clamp showing the clamp in closed position.

In general my battery cable clamp comprises a substantially U-shaped body 5, provided with an opening 6 adapted to fit the conventional storage battery post 7, and having a pair of widened arms provided with free end portions or arms 8 and 8ª; a fastening means 9, preferably including a standard bolt 10 and a nut 11; retaining means 12 preferably in the form of an embracing sleeve or hollow member 13; and a thrust means 14 preferably comprising a pin 15, and a thrust collar 16.

The body 5 is provided with a neck portion 17 designed to accommodate an end portion of a standard battery cable 18 in any conventional manner. The body 5 is made of any suitable material such as lead, having sufficient resiliency, so that the widened end portions 8 and 8ª, are capable of converging and diverging movement, or in other words to be spread apart or drawn toward each other, without likelihood of fracture.

Figure 2:
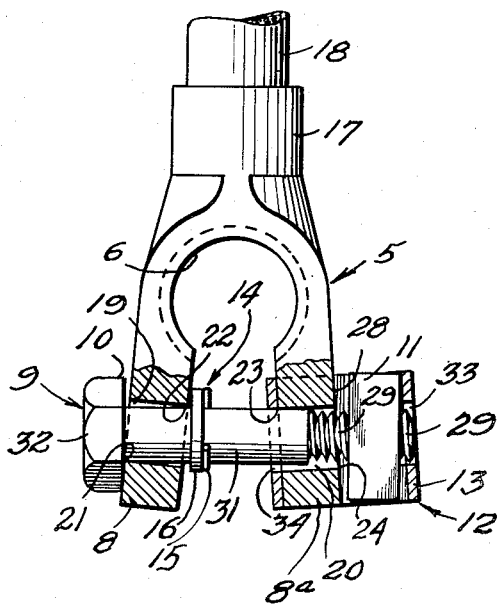
Fig. 2 is a plan view of the clamp in partial section along the longitudinal axis of the bolt, and showing the clamp in open position.
Figure 4:
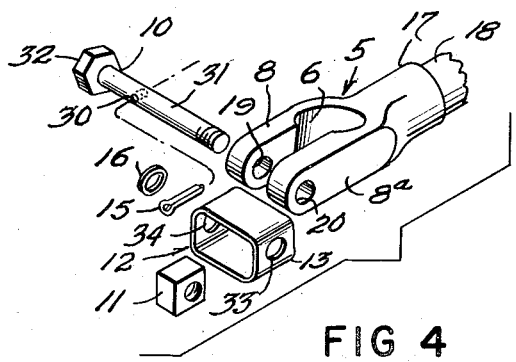
Fig. 4 is an exploded perspective view of the clamp on a reduced scale showing its constituent elements.

The widened end portions 8 and 8ª are provided with transversely extending apertures 19 and 20, respectively, which are relatively coaxial with the clamp in its closed position as in Fig. 1. The apertures 19 and 20 accommodate the shank 31 of the bolt 10 and have diameters sufficiently greater than the shank diameter, so that the bolt may freely move longitudinally relative to the axes of the apertures, when a converging or diverging movement is imparted to the widened end portions 8 and 8ª. Thus, as shown in Fig. 2, binding action between the bolt 10 and the exterior and interior edges 21 and 22, respectively, of aperture 19, and the similar edges 23 and 24 of aperture 20 is rendered negligible.

The widened end portion 8 is provided with an exterior face 25, which is substantially parallel to its inner face 26. The end portion 8ª is similarly provided with faces 27 and 28. When the end portions 8 and 8ª are in their closed position, as shown in Fig. 1, the faces in one end portion are in substantially parallel relationship to the faces of the other end portion.

The bolt 10 of the fastening means 9 is preferably a standard bolt, having threads 29 at its one end, and is coextensive with the apertures 19 and 20. The bolt 10 is provided with a nut 11 at its end which is contiguous with the exterior face 28 of end portion 8ª. The bolt is further provided with a hole 30 which etxends transversely thru the shank 31 of the bolt, and is spaced from the bolt head 32 at a distance slightly greater than the thickness of the end portion 8.

The embracing sleeve 13 of the retaining means 12 may be cut from any suitable rectangular tubular material or made from sheet metal stock, and seam-welded together. The sleeve 13 is provided with openings 33 and 34 arranged, so that the bolt shank 31 is coextensive with the openings when the sleeve is in embracing relationship with the nut 11 and the end portion 8ª.

The pin 15 of the thrust means 14 is preferably a standard cotter pin, and is located by means of a driving fit within the hole 30 of bolt 10. The thrust collar 16 is preferably a standard washer and is disposed intermediate the pin 15 and the interior face 26 of the end portion 8.

Figure 3:
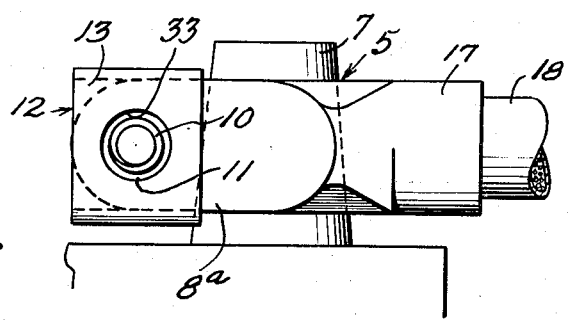
Fig. 3 is an edge view of the clamp showing it mounted on the post of a storage battery.

To locate the clamp on the post of a storage battery, the clamp is placed over the battery post so that the post 7 is disposed within the opening 6 of the body 5, as shown in Fig. 3. The bolt head 32 is then rotated in a clockwise direction, to tighten the clamp, which brings the bolt head 32 into forceful contact with the exterior face 25 of the end portion 8, and the nut 11 similarly contacts the exterior face 28 of the other end portion. The end portions are thereby given a converging movement until the battery post is securely engaged by the clamp.

To remove the clamp from the battery post, the bolt head 32 is rotated in the opposite direction which brings the thrust means 14 into forceful contact with the interior face of the end portion 8, and simultaneously brings the outer face of the nut 11, into forceful contact with the interior end face of embracing sleeve 13, abutting said outer face of nut 11, thereby causing forceful contact of the opposite interior end face of embracing sleeve 13 with the interior face 27 of end portion 8ª. The end portions are, thereby, given a diverging movement until any corrosive film formed on the battery post is severed, at which time the clamp is easily removed from the post.

During both the converging and diverging movements of the end portions, the nut 11 is prevented from any material rotation by means of the retaining means 12, and therefore a rotation of the bolt 10 alone is required to effect operation. Consequently, the use of only one wrench or other suitable tool is required. The operation is, thus rendered simply, rapidly, but yet effectively.

It should be pointed out that the retaining means 12 and the thrust means 14 may be easily adapted for use with most of the conventional battery clamps on the market.

I claim:

1. In combination with a battery cable clamp including a body having a bight and two apertured arms normally diverging from said bight, and a bolt and nut for said arms, protecting and retaining means for said nut including a hollow member having two confronting substantially parallel end walls, each having a perforation with the perforations substantially aligning and of a diameter slightly greater than the diameter of the shank of said bolt, a side wall joining the end walls and a side wall portion opposite said side wall, the shortest distance between the confronting faces of said end walls being slightly greater than the combined thickness of said nut and the free end portion of one of said arms in contact with said nut and the shortest distance between the inner faces of said side wall and side wall portion being very slightly greater than the shortest distance between said opposite faces, one of said end walls being in contact with the inner face of said one of said arms, and said nut section and free end portion being within said hollow member; and an abutment extending outwardly from said shank closely adjacent and overlaying a portion of the inner face of said other of said arms.

2. In combination with a battery cable clamp including a body having a bight and two apertured arms normally diverging from said bight, and a bolt and nut for said arms, retaining means for said nut including a hollow member having two confronting substantially parallel end walls, each having a perforation with the perforations substantially aligning and of a diameter slightly greater than the diameter of the shank of said bolt, a side wall joining the end walls and a side wall portion opposite said side wall, the shortest distance between the confronting faces of said end walls being slightly greater than the combined thickness of said nut and the free end portion of one of said arms in contact with the nut and the shortest distance between the inner faces of said side wall and side wall portion being very slightly greater than the shortest distance between said opposite faces, one of said end walls being in good frictional contact with the inner face of said one of said arms, and said nut and free end portion being within said hollow member, with said free end portion being in good frictional contact with said hollow member at the upper and lower faces of said free end portion; and an abutment extending outwardly from said shank section closely adjacent and overlaying the inner face of said other of said arms.

PHILIP H. PROFF.

REFERENCES CITED

The following references are of record in the file of this patent:

UNITED STATES PATENTS

| Number | Name | Date |
|---|---|---|
| 1,650,064 | Dennis | Nov. 22, 1927 |
| 1,699,925 | Schmidt | Jan. 22, 1929 |
| 1,820,611 | Goldman | Aug. 25, 1931 |
| 1,841,371 | Hughes | Jan. 19, 1932 |
| 2,040,817 | Aumer | May 19, 1936 |
| 2,154,507 | Hunefeld | Apr. 18, 1939 |
| 2,287,490 | Tenney | June 23, 1942 |
| 2,462,660 | Moore | Feb. 22, 1949 |